US009569891B2

(12) United States Patent
Lukander

(10) Patent No.: US 9,569,891 B2
(45) Date of Patent: Feb. 14, 2017

(54) METHOD, AN APPARATUS AND AN ARRANGEMENT FOR VISUALIZING INFORMATION

(75) Inventor: Kristian Lukander, Espoo (FI)

(73) Assignee: TYOTERVEYSLAITOS, Helsinki (FI)

( * ) Notice: Subject to any disclaimer, the term of this patent is extended or adjusted under 35 U.S.C. 154(b) by 1736 days.

(21) Appl. No.: 12/837,661

(22) Filed: Jul. 16, 2010

(65) Prior Publication Data

US 2012/0014602 A1 Jan. 19, 2012

(51) Int. Cl.
*G06K 9/00* (2006.01)
*G06T 19/00* (2011.01)

(52) U.S. Cl.
CPC ......... *G06T 19/00* (2013.01); *G06T 2219/008* (2013.01)

(58) Field of Classification Search
USPC .................................................. 382/128–134
See application file for complete search history.

(56) References Cited

U.S. PATENT DOCUMENTS

| 4,333,145 | A | * | 6/1982 | Heuscher ............... A61B 6/032 250/362 |
| 5,431,161 | A | * | 7/1995 | Ryals et al. ................... 600/425 |
| 6,167,296 | A | | 12/2000 | Shahidi |
| 6,263,096 | B1 | * | 7/2001 | Boag et al. .................... 382/128 |
| 2009/0105579 | A1 | * | 4/2009 | Garibaldi ........... A61B 1/00158 600/409 |

OTHER PUBLICATIONS

Lukander, K., "Tang'o-Tangible Projections", 13th International Conference on Human-Computer Interaction, HCI International 2009, San Diego, CA, USA, Jul. 19-24, 2009, pp. 377-381.
Lukander, K., "Tang'o-Tangible Projections", Poster Art from 13th International Conference on Human-Computer Interaction, HCI International 2009, San Diego, CA, USA, Jul. 19-24, 2009.

* cited by examiner

*Primary Examiner* — Alex Liew
(74) *Attorney, Agent, or Firm* — Young & Thompson

(57) ABSTRACT

A method, an apparatus, an arrangement and a computer readable storage medium for determining an image based at least in part on first data having a first representation is provided. The approach comprises determining a projection of an imaging element on the first representation, the imaging element being arranged to at least partly overlap with the first representation, determining a first subset of data as the subset of the first data corresponding to the projection of the imaging element on the first representation, and determining the image based at least in part on the first subset of data.

22 Claims, 6 Drawing Sheets

METHOD, AN APPARATUS AND AN ARRANGEMENT FOR VISUALIZING INFORMATION

FIELD OF THE INVENTION

The invention relates to visualizing information and determination of an image.

BACKGROUND OF THE INVENTION

Inspecting details of three-dimensional data or two-dimensional data having a layered structure many times involves creating and inspecting two-dimensional extracts of a desired part of the three-dimensional data or of a certain layer of the two-dimensional data having a layered structure. Often this also involves switching between two or more two-dimensional extracts as part of inspection of a certain detail of the data.

Visualizing and displaying three-dimensional data or a set of two-dimensional data with multiple views as one or more two-dimensional images typically requires mastering a complex user interface, making exploring such data a time-consuming effort. Prior art solutions for exploring such typically involve using sophisticated software/hardware tools, control of which requires a combination of actions using a mouse, a keyboard and possible other instruments of a user interface, still possibly providing a limited and rather tedious access to the data.

U.S. Pat. No. 6,167,296 discloses a surgical navigation system having a computer with a memory and a display connected to a surgical instrument or pointer and position tracking system. The computer memory is loaded with data e.g. from a volumetric scan of a patient, and this data is utilized to dynamically display three-dimensional perspective images of the patient's anatomy from the viewpoint of the pointer. Hence, the approach of U.S. Pat. No. 6,167,296, designed for surgical applications, makes use of a point-like pointer device to determine the viewpoint to data, which is visualized on an external display.

Accordingly, it is an object of the invention to provide an illustrative, intuitive and easy-to-use approach for visualizing any information in an effective manner, especially information having or arranged to have a three-dimensional structure or two-dimensional data having a layered structure.

SUMMARY OF THE INVENTION

According to a first aspect of the present invention, there is provided a method for determining an image based at least in part on first data having a first representation, the method comprising determining a projection of an imaging element on the first representation, the imaging element being arranged to at least partly overlap with the first representation, determining a first subset of data as the subset of the first data corresponding to the projection of the imaging element on the first representation, and determining the image based at least in part on the first subset of data.

According to an embodiment of the invention, determining a projection may comprise obtaining information regarding the position and/or the orientation of the imaging element within the virtual volume, for example obtaining sensory data regarding the position and/or orientation from a sensor, such as an accelerometer or an electromagnetic sensor.

In accordance with an embodiment of the invention, the first representation may comprise a virtual volume in a space, and determining the projection may comprise determining a two-dimensional intersection of the imaging element and the virtual volume. According to an embodiment of the invention, the first representation may comprise a two-dimensional image displayed on a surface, and determining the projection may comprise determining the projection of the imaging element on the two-dimensional image.

According to a second aspect of the present invention, there is provided an imaging apparatus for determining an image based at least in part on first data having a first representation, the apparatus comprising an imaging element for providing a projection on the first representation, a processing element, configured to determine a projection of the imaging element on the first representation, the imaging element being arranged to at least partly overlap with the first representation, determine a first subset of data as the subset of the first data corresponding to the projection of the imaging element on the first representation, and determine the image based at least in part on the first subset of data.

According to a third aspect of the present invention, there is provided an arrangement for visualizing data, comprising means for providing a positioning reference within a virtual volume in a space, and an imaging apparatus according to the second aspect of the invention.

According to a fourth aspect of the present invention, there is provided a computer readable storage medium comprising program code for determining an image based at least part on first data having a first representation the program code configured to determine a projection of an imaging element on the first representation, the imaging element being arranged to at least partly overlap with the first representation determine a first subset of data as the subset of the first data corresponding to the projection of the imaging element on the first representation, and determine the image based at least in part on the first subset of data.

The invention provides a method, an apparatus, an arrangement and a computer readable storage medium providing an illustrative, intuitive and easy-to-use approach for visualizing any information, especially complex multi-dimensional information in an effective manner.

DETAILED DESCRIPTION

In the following, the invention will be described in detail with a reference to various embodiments of the invention and the accompanying drawings.

Figure 1:
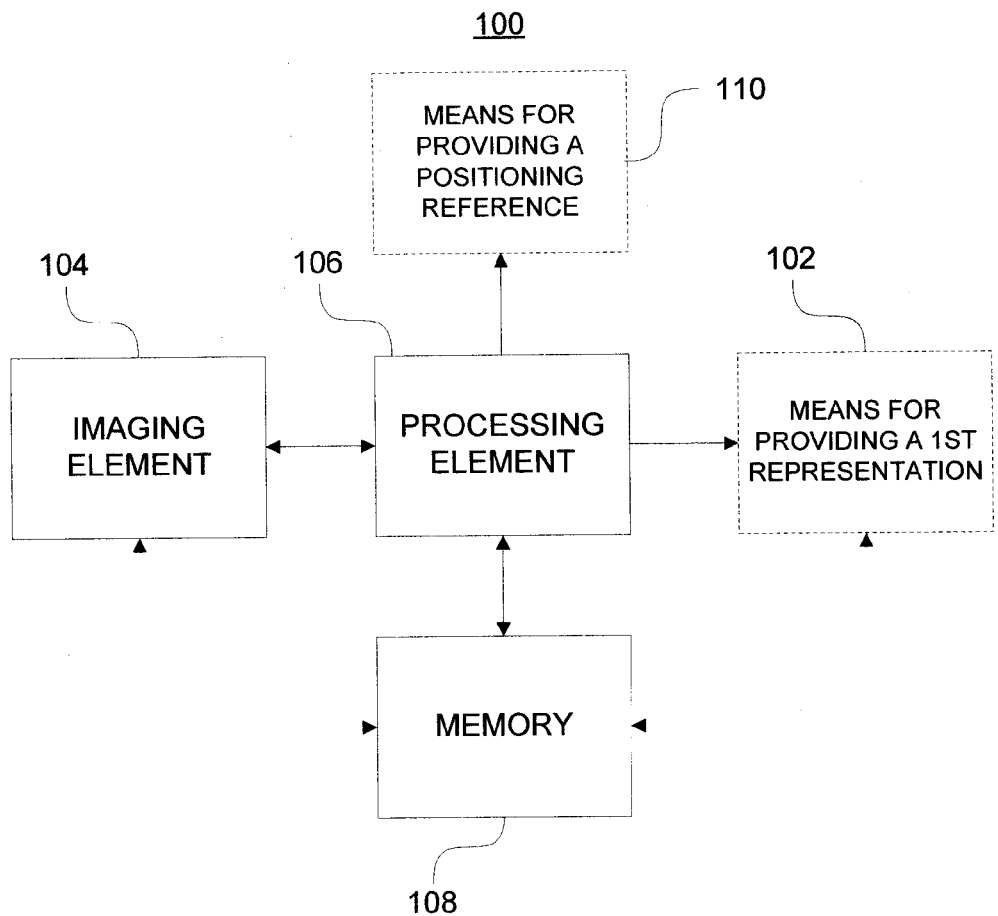
FIG. 1 provides a schematic illustration of an imaging apparatus according to an embodiment of the invention.

FIG. 1 provides a schematic illustration of an imaging apparatus 100 for determining an image based at least in part on first data having a first representation according to an embodiment of the invention. The imaging apparatus 100 comprises an imaging element 104 and a processing element 106, connected to the imaging element 104 to enable exchange of data and control information. Furthermore, the imaging apparatus 100 typically also comprises a memory element 108, connected to the processing element 106 to enable accessing data, configuration/control information and program code that may be stored in the memory element 108. The imaging element 104 may be optionally connected directly to the memory element 108 to enable access for example to data and/or configuration/control information stored therein.

According to an embodiment of the invention, the processing element 106 and/or the memory element 108 may be coupled with the imaging element 104.

According to another embodiment of the invention, the processing element 106 and the memory element 108 are comprised in a processing unit (physically) separate from the imaging element 104. Such a unit may be for example in a general purpose computer to which the imaging element 104 may be connected by wireless or wireline communication means. In such an embodiment the imaging element 104 may comprise a processing element 306 in addition to or instead of the processing element 106 and/or a memory element 308 in addition to or instead of the memory element 108.

In embodiments of the invention, the processing element 106 may comprise one or more processing units, such as microprocessors, microcontrollers, digital signal processors (DSP) or the like. Furthermore, in embodiments of the invention, the memory element 108 may comprise any suitable computer readable storage medium. The memory element may comprise one or more memory units. The memory units may be coupled to the imaging apparatus 100 in a fixed manner or the memory units may be removable memory units. The memory element 108 may comprise data, control information and/or program code comprising executable instructions.

According to an embodiment of the invention, the imaging apparatus 100 further comprises means for providing a first representation of data 102. The means for providing a first representation 102 may be connected to the processing element 106 to enable providing data and control information from the processing element 106 to the means for providing a first representation of data 102. The means for providing a first representation 102 may be optionally connected directly to the memory element 108 to enable access to data and/or configuration/control information stored in the memory 108. According to an embodiment of the invention, the means for providing a first representation of data 102 may not require access to the data for which it provides a representation. In such a case the correspondence between the data and its representation may be determined for example by using a mapping function, as described hereinafter.

According to an embodiment, the imaging apparatus 100 is connected by wireless or wireline communication means to an apparatus acting as means for providing a first representation of data 102.

The means for providing a first representation of data 102 may comprise for example a data projector providing the first representation of data as a two-dimensional image displayed on a surface or a display on which an image comprising the first representation of data is displayed.

According to an embodiment of the invention, the imaging apparatus 100 further comprises means for providing a positioning reference 110 in order to enable providing a first virtual volume in a space within which a position of the imaging element 104 may be determined. The means for providing a positioning reference 110 may comprise for example an apparatus for providing one or more magnetic fields covering the space occupied by the first virtual volume, an ultrasound transmitter/receiver/transducer apparatus or arrangement providing an ultrasound-based positioning arrangement usable within the space occupied by the first virtual volume, an arrangement for optical positioning usable within the space occupied by first virtual volume, or other suitable positioning arrangement as known in the art.

In accordance with an embodiment of the invention, the imaging apparatus 100 is connected by wireless or wireline communication means to the means for providing a positioning reference 110.

According to an embodiment of the invention, the positioning reference provided by the means for providing a positioning reference 110, comprises the first representation of data. Hence, the first virtual volume in space provided by the means for providing a positioning reference 110 may comprise the first representation of data as a second virtual volume. In such an arrangement the means for providing a positioning reference 110 may conceptually also act as the means for providing the first representation of data 102.

A virtual volume, e.g. the first virtual volume that may be set by the means for providing a positioning reference 110 or the second virtual volume constituting a first representation of data, may be defined as a set of positions within a space. A virtual volume may have basically any shape, for example a cube, a polyhedron, a sphere, or the like. A virtual volume may basically have any size. For embodiments of the present invention, a suitable size for a virtual volume may be dependent for example on one or more of the size of the imaging element 104, type of data used as a basis for determining the image by the imaging apparatus 100, desired resolution of the first representation of data, user preferences, etc.

Figure 2:
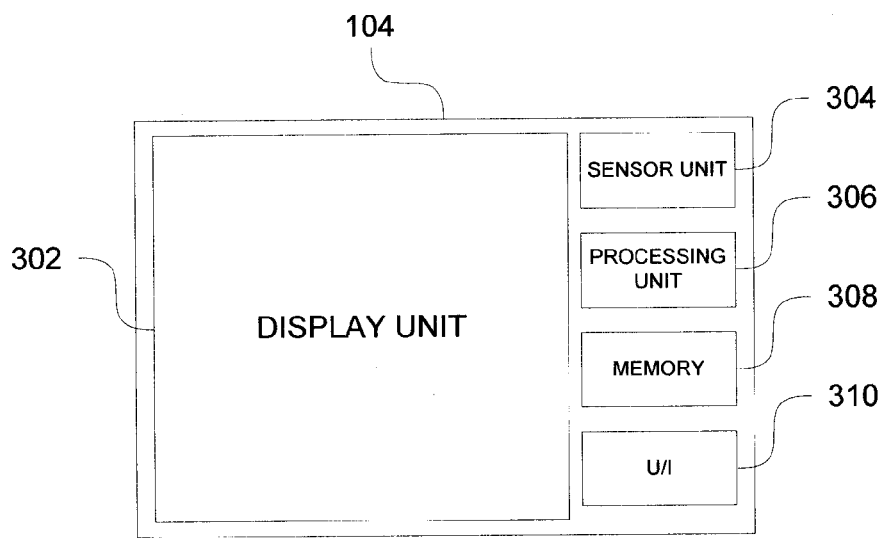
FIG. 2 provides a schematic illustration of an example of an imaging element according to an embodiment of the invention.

According to various embodiments of the invention, the imaging apparatus 100 may further comprise additional components or elements. As an example, the imaging apparatus 100 may comprise a user interface comprising e.g. a keyboard or keys, a touch screen, a mouse and/or the like, a display in order to enable user to control some aspects or features of the imaging apparatus 100, a communications element in order to enable the imaging apparatus 100 accessing external components, processing resources, information resources, etc According to an embodiment of the invention, the imaging apparatus 100 comprises an imaging element 104 for providing a projection on the first representation 210a, 210b. FIG. 2 provides a schematic illustration of an example of an imaging element 104 according to an embodiment of the invention.

An imaging element 104 is typically of an essentially rectangular or otherwise quadrangular shape. However, any shape is equally well applicable.

An imaging element 104 according to an embodiment of the invention may comprise a display unit 302, a sensor unit 304, a processing element 306 and a memory element 308.

Furthermore, an imaging element 104 may further comprise a user interface 310, such as a touch screen (usable with or without a stylus), a touchpad, a mouse, keys, a keyboard or a keypad and/or other suitable arrangement that enables input of data and commands by the user of the imaging element 104.

The display unit 302 may comprise a single display element on one side of the imaging element 104, or it may comprise for example one display element on the 'front side' of the imaging element 104 and another display element on the 'back side' of the imaging element 104. According to an embodiment of the invention, the display unit 302 comprises a translucent display element that may display an image on both sides of the display element—i.e. on both sides of the imaging element 104. The display unit 302 may cover essentially a whole surface of the imaging element 104, or it may cover only part of a surface of the imaging element 104.

An optional processing element 306 of the imaging element 104 may be an additional processing element in addition to the processing element 106 comprised in the imaging apparatus 100, or it may replace the processing element 106. An optional memory element 308 may be an additional memory element in addition to the memory element 108, or it may act as a sole memory element of the imaging apparatus 100.

As an example, the imaging element 104 may be embodied as a laptop computer, a tablet computer, a mobile phone or as a similar type of apparatus.

According to an embodiment of the invention, an imaging apparatus 100 for determining an image based at least in part on first data having a first representation 210a, 210b comprises an imaging element 104 for providing a projection 204a, 204b on the first representation 210a, 210b and a processing element 106, 306 configured to determine the projection 204a, 204b of the imaging element 104 on the first representation, the imaging element 104 being arranged to at least partly overlap with the first representation 210a, 210b, determine a first subset of data as the subset of the first data corresponding to the projection 204a, 204b of the imaging element 104 on the first representation 210a, 210b, and determine the image based at least in part on the first subset of data.

According to an embodiment of the invention, an imaging apparatus 100 for determining an image based at least in part on first representation of first data comprises an imaging element 104 and a processing element 106, 306 configured to determine the position and/or orientation of the imaging element 104 within a virtual volume representing the first data, determine a projection of the first data based on at least a partial intersection of the imaging element 104 and the virtual volume representing the first data, and determine the image based on the projection.

The first data may be stored in the memory element 108 and/or in the memory element 308 of the imaging element 104 to be accessed by the processing element 106 and/or by the processing element 306 of the imaging element 104.

The first data may be predetermined static data that does not change over time. Alternatively, the first data or a subset of the first data may change or may be changed over time. As an example, the first data or a subset of the first data may be continuously updated. Updated data may be received via a communications element of the imaging apparatus 100 and stored in the memory element 108 and/or in the memory element 308 of the imaging element 104.

In accordance with an embodiment of the invention, the processing element 106, 306 may be configured to change or modify the first data based on input from the user of the imaging element 104 or the imaging apparatus 100. Furthermore, the processing element 106, 306 may be configured to adapt the first representation 210a, 210b to account for the modified first data. For example the user interface 310 or the user interface of the processing unit hosting the processing element 106 may be used to provide the user input.

According to an embodiment of the invention, in addition to the first data, there may be second data associated with the first data. Furthermore, there may be any number of further data sets associated with the first and/or second data, i.e. third data, fourth data, etc. The second data and further data sets may be stored for example in the memory element 108 and/or in the memory element 308 of the imaging apparatus 104 to be accessed by the processing element 106 and/or the processing element 306 of the imaging element 104.

The data, i.e. the first data, the second data and/or a further data set, may be associated with any real or virtual object. The data may be for example two-dimensional data associated with a two-dimensional object or three-dimensional data associated with a three-dimensional object. As a further example, the data may represent time series or otherwise different versions of two-dimensional objects or data elements, such as a series of (video) images, thereby forming a conceptually three-dimensional data representation. In a similar manner, as a yet further example, the data may represent a time series or otherwise different versions of three-dimensional objects or data elements, thereby forming a conceptually four dimensional data representation.

An imaging apparatus 100 according to an embodiment of the invention may be used for visualization for example in various data mining applications, for instance medical imaging data such as magnetic resonance images (MRI), x-ray images, models of real or virtual three-dimensional structures, such as buildings or the like, general circulation models (GCM), data from simulation models, time series of video images, map data, etc.

According to an embodiment of the invention, the first data and the second data may describe different aspects or characteristics of an object. As an example, first data and second data may represent different layers of an object, for instance a surface of the object and the structures or elements below the surface of the object, respectively. As another example, first data and second data may be used to represent a front side and a back side of an object, respectively. As a further example, the first data, the second data, and a number of subsequent data sets may be used to represent an object as a function of time, providing a data set for each time instant of interest.

In the following only first data and second data are discussed, but the discussion generalizes to any number of data sets.

The first representation 210a, 210b of first data may comprise a two-dimensional or a three-dimensional representation of the first data. As an example, a two-dimensional representation may comprise a two-dimensional image or another suitable two-dimensional representation of data. As an example, a three-dimensional representation may comprise a virtual volume in a (three-dimensional) space or other suitable arrangement, specified for instance by a certain location within the space. A three-dimensional representation may be a visible or a non-visible representation. In the latter case in particular, the location of the three-dimensional representation within the space may be indicated with external means or the location may be otherwise known.

The first representation may be dependent on a positioning reference arrangement provided by the means for providing a positioning reference 110. According to an embodiment of the invention, the first representation is provided as a second virtual volume 210a in a space within a first virtual volume in the space provided by the means for providing a positioning reference 110. According to an embodiment of the invention, the first representation 210a is independent of a positioning reference arrangement. In such a case the second virtual volume 210a may be provided and its position determined by the means for providing a first representation According to an embodiment of the invention, an arrangement for visualizing data comprises an imaging apparatus 100. Furthermore, an arrangement according to an embodiment of the invention may comprise means for providing a positioning reference 110 within a first virtual volume in a space, and/or means for providing a first representation of data 102.

Figure 3A:
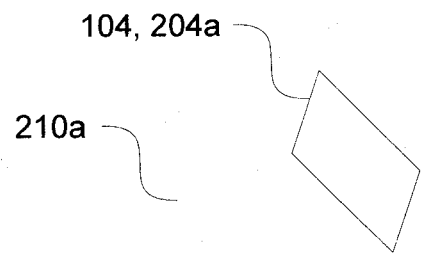
FIG. 3a provides a schematic illustration of an example of an arrangement for visualizing data according to an embodiment of the invention.

FIG. 3a provides a schematic illustration of a first example arrangement 200a for visualizing data according to an embodiment of the invention. In the example arrangement 200a a first representation of first data as a second virtual volume 210a in a three-dimensional space is illustrated. Furthermore, FIG. 3a illustrates the imaging element 104 arranged in a position within the second virtual volume 210a. Hence, the imaging element arranged in a position within the virtual volume 210a provides the projection 204a of the imaging element 104 on the first representation 210a. The projection 204a may be used to determine a first subset of data as the subset of the first data corresponding to the projection 204a of the imaging element 104 on the first representation 210a, and determine an image based at least in part on the first subset of data.

The second virtual volume 210a may be located within a first virtual volume provided by the means for providing a positioning reference 110, as described hereinbefore. Hence, in such an arrangement the means for providing a positioning reference 110 conceptually acts also as the means for providing a first representation of data 102. Alternatively, the location of the second virtual volume 210b may be determined by the user of the imaging element 104 or the imaging apparatus 100 without making use of an apparatus providing a positioning reference. In such an arrangement the imaging element 104 may be considered to conceptually act also as the means for providing the positioning reference 110 and/or the means for providing a first representation of data 102.

Figure 3B:
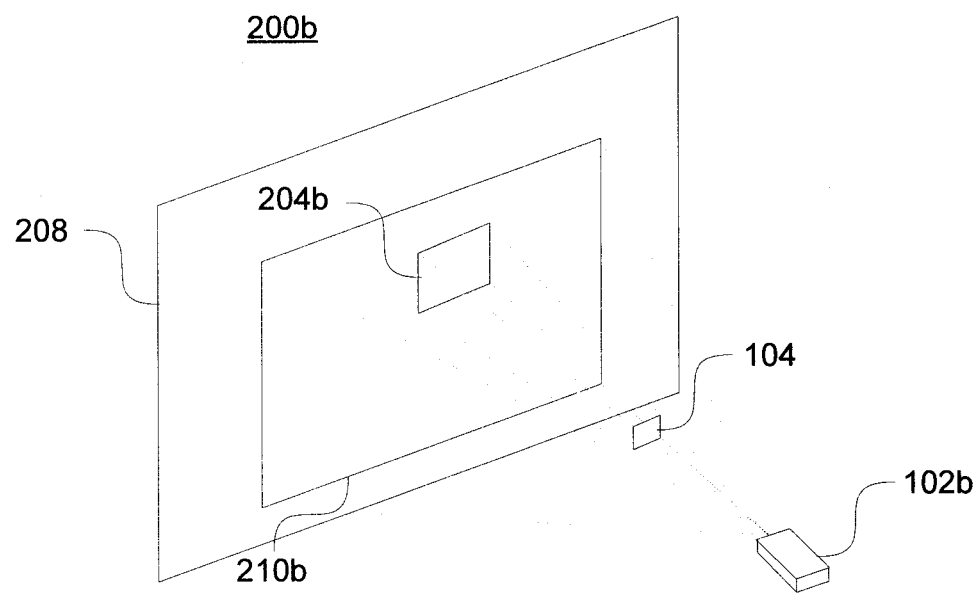
FIG. 3b provides a schematic illustration of an example of an arrangement for visualizing data according to an embodiment of the invention.

FIG. 3b provides a schematic illustration of a second example arrangement 200b for visualizing data according to an embodiment of the invention. In the example arrangement 200b the means for providing a first representation 102b comprises a data projector apparatus, as known in the art, configured to provide the first representation 210b of first data, and an imaging apparatus 100 according to an embodiment of the invention, comprising an imaging element 104.

In the example arrangement 200b for visualizing data the projector apparatus 102b is configured to provide the first representation as a two-dimensional image 210b displayed on a surface 208, which in this example is an essentially planar surface. Furthermore, FIG. 3b illustrates a projection 204b of the imaging element 104 on the two-dimensional image 210b.

In a variation of the second example arrangement 200b the means for providing a first representation 102 may comprise a display on which a two-dimensional image 210b is displayed. In this variation of the example arrangement 200b the data projector apparatus may not be employed.

According to an embodiment of the invention, calibration information comprising information that enables determination of the position of the first representation 210a, 210b with respect to a predetermined reference position is provided in order to enable determination of a projection 204a, 204b of the imaging element 104 on the first representation 210a, 210b.

The calibration information may comprise information regarding the predetermined reference position. The predetermined reference position may be a position of one of the elements or components associated with an arrangement for visualizing data 200a, 200b, or any other position suitable for determination of the relative positions of the elements or components associated with the arrangement 200a, 200b.

According to an embodiment of the invention, the calibration information further comprises information that enables determination of the position of a first virtual volume provided by the means for providing a positioning reference with respect to the predetermined reference position. This information enables mapping a position determined with respect to the first virtual volume to a position with respect to the first representation.

According to an embodiment of the invention, the calibration information further comprises information that enables determining a viewing position with respect to the predetermined reference position. The viewing position may be for example the position of the means for providing the first representation 102, such as a data projector, or assumed or known position of a person viewing the first representation 210a, 210b.

As an example, the calibration information may comprise information that enables determination of the position of the first representation comprising a two-dimensional image 210b and the viewing position within the predetermined coordinate system, such as information that defines the positions of the corners of the two-dimensional image 210a and the viewing position within the predetermined coordinate system. As another example, the calibration information may comprise information that defines the positions of the corners of the first representation comprising a second virtual volume 210b within the predetermined coordinate system. Alternatively or additionally, the calibration information may comprise information based on which the above-mentioned positions may be determined, such as information defining the position of one of the corners of the second virtual volume within the predetermined coordinate system and information determining the orientation and size of the second virtual volume with respect to the axes of the predetermined coordinate system.

According to various embodiments of the invention, any position within a space may be expressed for example as a tuple (x, y, z) indicating coordinates along the three axes of a predetermined coordinate system with respect to the origin of the predetermined coordinate system. As another example, a position may be expressed as a tuple (d, α, β, φ), where d indicates the distance from the origin of the predetermined coordinate system, and α, β, φ indicate angles with respect to the three axes of the predetermined coordinate system. As an example, the predetermined reference position may be the origin of the predetermined coordinate system. The calibration information may further comprise information regarding the axes of the predetermined coordinate system.

In the following, unless explicitly stated otherwise, positions are discussed as positions within a predetermined coordinate system. However, any information that can be used to specify a position within a space may be equally well used within embodiments of the invention.

According to an embodiment, the first representation 210a, 210b has a fixed position in relation to the viewing position, thereby enabling usage of predetermined calibration information in this regard.

According to another embodiment, the viewing position in relation to the first representation 210a, 210b may vary over time. The position of the first representation 210a, 210b may change for example in response to input from the user of the imaging apparatus 100 and/or the imaging element 104. Moreover, the viewing position may be moved or changed, the first representation may be moved, or both the viewing position and the first representation 210a, 210b may be moved but in different directions and/or different distances. Regardless of the nature of the movement, the calibration information is updated to reflect the changed position(s) in order to enable determining the projection of the imaging element 104 on the first representation 210a, 210b.

The projection of the imaging element 104 on the first representation 210a, 210b may be provided by arranging the imaging element 104 to at least partly overlap with the first representation 210a, 210b.

In an embodiment of the invention where the first representation comprises a two-dimensional image 210b displayed on a surface 208, the arranging may include positioning the imaging element 104 between the viewing position and the two-dimensional image 210b in such a way that the imaging element 104 at least partly covers the view on the two-dimensional image 210b.

In an embodiment of the invention where the first representation comprises a virtual volume 210a in a space, the arranging may include positioning the imaging element 104 in such a way that it is at least partly within the virtual volume 210a. When the imaging element 104 is arranged this way within the virtual volume 210a, the (surface of the) imaging element 104 determines a two-dimensional projection on (i.e. intersection of) the virtual volume 210b.

According to an embodiment of the invention, the processing element 106, 306 is configured to determine a projection 204a, 204b of the imaging element 104 on the first representation 210a, 210b, the imaging element 104 being arranged to at least partly overlap with the first representation 210a, 210b.

In an embodiment of the invention, the processing element 106, 306 is configured to determine a projection 204a, 204b of the imaging element 104 on the first representation 210a, 210b, wherein the determining comprises obtaining information regarding the position of the imaging element 104 and/or the orientation of the imaging element 104 within a virtual volume in a space. This may comprise determining the position and/or orientation of the imaging element 104 within the first virtual volume 210a provided by the means for providing a positioning reference.

In accordance with an embodiment of the invention, determining the projection 204a, 204b may further comprise obtaining information regarding the position and/or orientation of the imaging element 104 with respect to the first representation 210a, 210b. This may, for example, comprise determining the position and/or the orientation of the imaging element 104 with respect to the second virtual volume 210a.

Obtaining information regarding the position and/or orientation of the imaging element 104 with respect to the first representation 210a, 210b may comprise determining the position and/or the orientation of the imaging element 104 within the predetermined coordinate system, and using the determined information together with the calibration information to determine the position and/or orientation of the imaging element 104 with respect to the first representation 210a, 210b. The obtained information regarding the position and/or orientation of the imaging element 104 with respect to the first representation 210a, 210b may be, in turn, used by the processing element 106, 306 to determine the projection 204a, 204b of the imaging element 104 on the first representation 210a, 210b.

Additionally, determining a projection 204a, 204b of the imaging element 104 on the first representation 210a, 210b may comprise obtaining information regarding the position and/or orientation of the imaging element 104 with respect to the viewing position. This may comprise determining the position and/or orientation of the imaging element 104 within the predetermined coordinate system and used together with the calibration information to determine the position and/or orientation of the imaging element 104 with respect to the viewing position. The obtained information regarding the position and/or orientation of the imaging element 104 with respect to the viewing position may be, in turn, used by the processing element 106, 306 together with the information regarding the position and/or orientation of the imaging element 104 with respect to the first representation 210a, 210b to determine the projection 204a, 204b of the imaging element 104 on the first representation 210a, 210b.

As an example, the first representation may comprise a two-dimensional image 210b displayed on a surface 208. In such a case the processing element 106, 306 may compute a position or positions determining the projection 204b on the two-dimensional image 210b based on the viewing position, on position(s) of the edge(s) of the imaging element 104 and on position(s) of the edge(s) of the two-dimensional image 210b. If, for instance, both the imaging element 104 and the two-dimensional image 210b are of rectangular shape, the positions of the edge(s) of the imaging element 104 may be determined based on positions of the corners of the imaging element 104, and the position of the edge(s) of the two-dimensional image 210b may be determined based on positions of the corners of the two-dimensional image 210b.

As another example, the first representation may comprise a virtual volume 210a in a space. In such a case the processing element 106, 306 may compute a position or positions determining the projection 204a on the second virtual volume 210a based on position(s) of the outer edge(s) of the imaging element 104 and on position(s) of the outer edge(s) of the second virtual volume 210a. In other words, the processing element 106, 306 determines the projection 204a as an intersection of the imaging element 104 and the second virtual volume 210a. For instance, if the imaging element 104 has a rectangular shape and the second virtual volume 210a has a cubical shape, the positions of the edge(s) of the imaging element 104 may be determined based on positions of the corners of the imaging element 104, and the position of the edge(s) of the second virtual volume 210a may be determined based on positions of the corners of the second virtual volume 210a.

According to an embodiment of the invention, determining a projection 204a, 204b of an imaging element 104 on the first representation 210a, 210b comprises determining the projection of the display unit 302 of the imaging element 104 on the first representation 210a, 210b. The discussion above regarding determination of the projection of the imaging element 104 applies to determination of the projection of the display unit 302 of the imaging element 104.

In accordance with an embodiment of the invention, in case of a three dimensional first representation 210a, the processing element 106, 306 is configured to determine a projection 204a of the imaging element 104 on the first representation 210a, with respect to an axis within a virtual volume 210a in space. A projection may be determined for example as a two-dimensional projection on a plane perpendicular to said axis. Assuming an example where a position within a predetermined coordinate system, and consequently within the virtual volume, may be expressed by a tuple (x, y, z) indicating coordinates along the three axes of a predetermined coordinate system with respect to the origin of the predetermined coordinate system, the axis respect to which the projection is determined may be for example the z axis, thereby providing a projection that is parallel to the plane determined by the x and y axes. This may be considered as 'locking' the projection 204a on the first representation 210a to be determined with respect to an axis.

According to an embodiment of the invention, the 'locking' may be controlled via the user interface 310 of the imaging element 104. In another embodiment of the invention, the 'locking' function may be controlled via a user interface of a processing unit comprising the processing element 106. As an example, they user interface 310 or the user interface of the processing unit comprising the processing element 106 may enable the user to select an axis or a direction with respect to which the 'locking' is applied, to 'lock' the projection 204a and/or to 'unlock' the projection 204a.

According to an embodiment, the imaging element 104 comprises a sensor unit 304 providing information regarding the position and/or the orientation of the imaging element 104. The position and/or orientation information may be determined for example with respect to the first virtual volume provided by the means for providing a positioning reference. The information regarding the position and/or the orientation of the imaging element 104 provided by the sensor unit 304 may be used to determine the projection 204a, 204b of the imaging element 104 on the first representation 210a, 210b. The sensor unit 304 may comprise one or more sensors. Furthermore, the one or more sensors may comprise sensors of a similar type or sensors of two or more different types.

According to an embodiment of the invention, the position and orientation of a sensor with respect to the outer edges of the imaging element 104 are known, and they are stored as configuration information for example in the memory unit 306 in the imaging element 104 or in the memory unit 106. Using the position and orientation information provided by a sensor together with the configuration information regarding the sensor's position and orientation with respect to the outer edges of the imaging element 104 it is possible to determine the positions of the outer edges of the imaging element 104. The information regarding the position and/or the orientation of the imaging element provided by the sensor and the configuration information is provided to a processing unit 106, 306, which may use this information to determine the position of the imaging element 104. As an example, in case of an imaging element 104 having a rectangular shape, this may enable determining the positions of the corners of the imaging element 104.

According to an embodiment, the one or more sensors of the sensor unit 304 may be arranged at the edges of the imaging element 104 in order to enable more direct determination of the positions of the outer edges of the imaging element 104. For example an imaging element 104 having a rectangular or quadrangular shape may have a sensor arranged in each or some of its corners to enable determination of the positions of the outer edges of the imaging element 104 based on the knowledge of the positions of the corners of the imaging element 104.

In accordance with an embodiment of the invention, the one or more sensors of the sensor unit 304 and the respective configuration information may be configured for determination of the projection of a display unit 302 of the imaging element 104 instead of the projection of the imaging element 104 as a whole.

According to an embodiment of the invention, a positioning arrangement based on one or more magnetic fields is used to obtain information regarding the position and/or orientation of the imaging element 104. In such an arrangement the sensor unit 304 comprises an electromagnetic sensor providing data regarding the position and/or the orientation of the imaging element 104 with respect to a magnetic field. An electromagnetic sensor may also be called a magnetometer. The magnetic field may be provided within a first virtual volume in space for example by the means for providing a positioning reference 110. As an example, a magnetic field having predetermined characteristics spanning over a desired location within a space may be provided, and the position and/or orientation of an electromagnetic sensor within the magnetic field may be determined, as known in the art.

In accordance with an embodiment of the invention, the means for providing a positioning reference may provide three magnetic fields arranged such that they span three mutually orthogonal magnetic fields within a first virtual volume. One or more magnetometers comprised in the sensor unit 304 of the imaging element 104 provide data that enables determining the position and/or orientation of the imaging element 104 within each of the three magnetic fields—and consequently enables determining the position and/or the orientation of the imaging element 104 within the first virtual volume. Together with the calibration information the position within the first virtual volume enables determining a position within the predetermined coordinate system and/or in relation to the first representation 210a, 210b.

According to an embodiment of the invention an ultrasound-based positioning arrangement, as known in the art, is used to obtain information regarding the position and/or orientation of the imaging element 104. As an example of such an arrangement the sensor unit 304 comprises an ultrasound sensor providing data regarding the position and/or the orientation of the imaging element 104 with respect to a first virtual volume provided by one or more ultrasound transmitters comprised in the means for providing a positioning reference 110. Hence, the ultrasound sensor and one or more ultrasound transmitters constitute an ultrasound-based positioning arrangement. A sensor unit 304 according to an embodiment of the invention may comprise one or more ultrasound sensors. As an example, one or more ultrasound transmitters enabling determination of position and/or orientation of an ultrasound sensor within a desired location within a three-dimensional space may used. The positions of an ultrasound sensor with respect to an ultrasound transmitter can be determined based on observed sound propagation time between an ultrasound transmitter and an ultrasound sensor, as known in the art. In accordance with an embodiment of the invention, the sensor unit 304 comprises one or more ultrasound sensors providing data that enables determining the position and/or orientation of the imaging element 104 within the predetermined coordinate system.

According to a further embodiment of the invention any other suitable positioning arrangement, such as one based on optical positioning or a compass, may be used to determine the position and/or the orientation of the imaging element 104.

In accordance with an embodiment of the invention, the first virtual volume provided by the means for providing a positioning reference, such as a magnetic field, one or more ultrasound transmitters or an equivalent positioning arrangement, comprises a second virtual volume providing the first representation 210a of data.

According to an embodiment of the invention, the sensor unit 304 comprises an accelerometer providing data regarding the relative position and/or orientation of the imaging element 104. A sensor unit 304 according to an embodiment of the invention may comprise one or more accelerometers, for example three accelerometers can be used to ensure obtaining information along each of the axes of the predetermined coordinate system. An accelerometer provides information regarding a relative change in position and/or orientation, as known in the art. Therefore, according to this embodiment of the invention the position and/or orientation information is determined in relation to a reference position and/or orientation of the imaging element 104. The reference position and/or orientation of the imaging element 104 may be determined upon activation or re-activation of the imaging apparatus 100 or the imaging element 104. Furthermore, the reference position and/or orientation of the imaging element 104 may be re-determined. The re-determination may be automatic and take place periodically, or the re-determination may be initiated by the user of the imaging apparatus 100 or the imaging element 104 via the user interface 310 or the user interface of the imaging apparatus 100. The reference position and/or orientation of the imaging element 104 may be included in the calibration information of the imaging element 104 discussed above.

According to an embodiment of the invention, the reference position and/or orientation of the imaging element 104 determines the location in the space comprising the first representation 210a as the second virtual volume. Consequently, according to this embodiment, the position and/or orientation of the imaging element 104 with respect to the reference position and/or orientation of the imaging element 104 may be used to determine the projection 204a, 204b of the imaging element 104 on the second virtual volume, and hence, on the first representation 210a, 210b.

In embodiments of the invention, the sensor unit 304 may comprise other type or types of sensors known in the art considered suitable for providing data regarding the position and/or orientation of the imaging element 104. Furthermore, according to an embodiment of the invention, the imaging element 104 may be coupled to an articulated arm that may provide information regarding the position and/or orientation of the imaging element 104, for example by making use of sensors of suitable type, as discussed above.

According to an embodiment of the invention, the processing element 106, 306 is configured to determine a first subset of data as the subset of the first data corresponding to the projection 204a, 204b of the imaging element 104 on the first representation 210a, 210b.

According to an embodiment of the invention, the projection 204a, 204b is a two-dimensional subset of the first representation 210a, 210b. As an example, in case the first representation comprises a two-dimensional image 210b displayed on a surface 208 the projection 204b is a subset of the two-dimensional image 210b. Consequently, the projection 204b corresponds to a subset of the first data corresponding to the subset of the two-dimensional image 210b. As another example, in case the first representation comprises a virtual volume 210a in a space the projection 204a is a two-dimensional intersection of the virtual volume 210a. Consequently, the projection 204a corresponds to a subset of the first data corresponding to the intersection of the virtual volume 210a.

The correspondence with the projection 204a, 204b of the imaging element 104 on the first representation 210a, 210b and the first data may be determined by using a mapping function and/or an inverse mapping function. In other words, a given element of the first data is represented by a certain position in the first representation, wherein the certain position may be indicated as coordinates within a three-dimensional space within the predetermined coordinate system. An inverse relationship is also valid, i.e. a given position in the first representation represents a certain element of the first data. Furthermore, the relationship between an element of the first data and a corresponding position in the first representation may be defined using a first mapping function f( ), whereas a first inverse mapping function $f^{-1}($ ) may be used to define the inverse relationship between a position in the first representation and the corresponding element of the first data.

Hence, according to an embodiment of the invention the processing unit 106, 306 is configured to use a first mapping function and/or a first inverse mapping function to determine a first subset of data as the subset of the first data corresponding to the projection 204a, 204b of the imaging element 104 on the first representation 210a, 210b.

The first data, the first mapping function and the first inverse mapping function may be stored in the memory 108, 308, and the correspondence between the first data and the projection 204a, 204b on the first representation 210a, 210b is determined by the processing element 106, 306.

As an example of correspondence between the first data and the first representation 210a, 210b based at least in part on the first data, a data element of the first data conceptually arranged into a three-dimensional array can be identified by coordinates x, y and z, where x denotes the position of the data element in the first dimension of the array, y denotes the position of the data element in the second dimension of the array, and z denotes the position of the data element in the third dimension of the array. The position in the first representation 210a, 210b corresponding to the data element in position (x, y, z) of the three-dimensional array is denoted (X, Y, Z), and it can be derived using a first mapping function f( ) as (X, Y, Z)=f(x, y, z). On the other hand, a position in the first representation 210a, 210b may be mapped to a data element in the three-dimensional array by using a first inverse mapping function $f^{-1}($ ) as (x, y, z)=$f^{-1}$(X, Y, Z).

The set of valid values of X, Y and Z to which the first inverse mapping function $f^{-1}$(X, Y, Z) may be applied can be restricted to ones that can be directly defined from valid values of x, y and z using the first mapping function f(x, y, z). Hence, the positions (X, Y, Z) of the first representation 210a, 210b may span a sparse three-dimensional grid (X, Y, Z)∈V that can be used for example to determine a set of valid position in the first representation 210a, 210b. In such a case a position (X', Y', Z') within the first representation 210a, 210b but not having a valid position, i.e. (X', Y', Z')∉V, is first transformed into a valid position (X", Y", Z")∈V before applying the first inverse mapping function f⁻( ) and the data element of the three-dimensional array corresponding to the transformed position within the first representation 210a, 210b is found as (x, y, z)=f⁻¹(X", Y", Z"). The transform may comprise determining a position among the valid positions within the first representation 210a, 210b that minimizes a cost function. As an example, the transform may comprise determining a position (X", Y", Z") that minimizes the Euclidean distance between the invalid position (X', Y', Z') and the valid positions within the first representation 210a, 210b.

The example above discusses a special case of mapping data arranged into a three-dimensional array into a three-dimensional representation. However, similar considerations are equally valid for data and/or representation of different dimension(s), for example for two-dimensional data and two-dimensional representation of the data. Furthermore, the dimensionality of the data and the corresponding representation of the data need not be the same. As an example, two-dimensional data may be mapped to a three-dimensional representation based at least in part on the two-dimensional data using a suitable first mapping function f( ) and a first inverse mapping function f⁻¹( )—and basically any combination of data dimension and the dimensionality of the corresponding representation of the data is applicable.

The correspondence between the first data and the first representation 210a, 210b based at least in part on the first data may be fixed or adaptive. In the case of fixed correspondence, a mapping function and the corresponding inverse mapping function remain fixed. In case the correspondence is adaptive, the adaptation may be realized by adapting the mapping function and the corresponding inverse mapping function to account for the desired amount of adaptation. As an example, adapting a mapping function and an inverse mapping function in such a manner that the valid positions of the first representation 210a, 210b are moved closer to each other along all dimensions of the first representation may be used to provide a view/representation covering a larger amount of the first data (i.e. "zoom out" functionality). As another example, adapting a mapping function and an inverse mapping function in such a manner that the valid positions of the first representation 210a, 210b are moved further away from each other along all dimensions of the first representation 210a, 210b may be used to provide a more detailed view/representation of the data (i.e. "zoom in" functionality). As a further example, a mapping function and an inverse mapping function may be adapted in such a way that only some of the dimensions of the first representation 210a, 210b are adapted and/or that the valid positions of the first representation 210a, 210b are brought closer to each other along a first dimension while the valid positions of the first representation 210a, 210b are brought further away from each other along a second dimension. Such adaptations may enable providing a larger or a more detailed view to the data along axis/axes of interest and/or enable providing larger view to the data along a first dimension and a more detailed view to the data along a second dimension.

As another—or complementary—possibility for providing a view/representation covering a larger amount of the first data or to provide more detailed view/representation of the first data is to modify the characteristics and/or position of the means for providing the first representation 210a, 210b. In this approach the adaptation of a mapping function and/or an inverse mapping function may not be required in order to provide 'zooming' functionality.

According to an embodiment of the invention, the 'zooming' in our out in the first representation may be controlled via the imaging element 104. As an example, the user interface 310 may be used to control the 'zooming'. In another embodiment of the invention, the 'zooming' function may be controlled via an user interface of a processing unit comprising the processing element 106.

The first representation 210a, 210b may cover only a portion of the first data. This may be the case for example due to 'zooming' in order to get a more detailed view/representation of the first data compared to the initial first representation or due to large set of the first data that cannot be accommodated in the first representation in a suitable granularity. Hence, according to an embodiment of the invention, the processing element 106, 306 may be configured to 'shift' the part of the first data comprised in the first representation 210a, 210b in order to change the portion of the first data comprised in the first representation 210a, 210b. Furthermore, in an embodiment of the invention, the means for providing a first representation of data 102 may be configured to modify the first representation 210a, 210b based on instructions from the processing element 106, 306. For example if the first representation comprises the second virtual volume 210a representing first data conceptually arranged into a three-dimensional array covering a first portion of the first data, the 'shifting' may comprise changing the first representation 210a to cover a second portion of the first data.

As an example, assuming first data conceptually arranged into a three-dimensional array and an element of the first data identified by coordinates x, y and z, the first portion of the first data may comprise data positions $x_1$ to $x_2$ along the first dimension of the array, data positions $y_1$ to $y_2$ along the second dimension of the array, and data positions $z_1$ to $z_2$ along the third dimension of the array. 'Shifting' of data may be employed to derive the second portion of the first data comprising data positions $x'_1$ to $x'_2$ along the first dimension of the array, data positions $y'_1$ to $y'_2$ along the second dimension of the array, and data positions $z'_1$ to $z'_2$ along the third dimension of the array. The 'shifting' may only concern a subset of the dimensions of the first data, the first data may be 'shifted' for example only along the first dimension of the array.

According to an embodiment of the invention, the 'shifting' may be controlled via the user interface 310 of the imaging element 104. In another embodiment of the invention, the 'shifting' function may be controlled via an user interface of a processing unit comprising the processing element 106.

According to an embodiment of the invention, the processing element 106, 306 is configured to determine an image based at least in part on the first subset of data corresponding to the projection 204a, 204b. The processing element 106, 306 may retrieve the first subset of data from the memory element 108, 308, determine the image based at least in part on the first subset, and provide the image for the imaging element 104. The image may be considered as a second representation based at least in part on the first data.

The processing element 106, 306 may be configured to determine the image automatically to correspond to the current position and/or orientation of the imaging element 104. As another example, the processing element may be configured to determine the image once the imaging element 104 has been in an essentially the same position and/or orientation for a predetermined time. As a further example, the processing element 106, 306 may be configured to determine the image upon a command provided via the user interface 310 or the user interface of the imaging apparatus 100.

According to an embodiment of the invention, the imaging element 104 is configured to display the image provided by the processing element 106, 306 on the display unit 302. Instead of or in addition to displaying the image on the display unit 302, the image may be stored in the memory element 108, 308 for subsequent use or the processing element 106, 306 may for example provide the image to another (external) display element to be displayed.

The image may be displayed and/or stored in the memory element 108, 308 upon a command provided via the user interface 310 or the user interface of the imaging apparatus 100. Furthermore, the imaging element may be configured to display the image on the display unit 302 until a further command via the user interface 310 or the user interface of the imaging apparatus 100 is issued.

According to an embodiment of the invention, the position and/or the orientation of the first representation may be moved or changed. As an example, the first representation may be moved by the user of the imaging element 104 and/or the imaging apparatus 100 by providing a command via the user interface 310 or via a user interface of the imaging apparatus 100. As an example in this regard, the moving of the first representation may comprise the user arranging the imaging element 104 to a first position and issue a first command in order to cause the imaging apparatus 100 to determine the projection 204a of the imaging element 104 on the first representation 210a, and determining and displaying an image corresponding to the projection of the display unit 302 of the imaging element 104, as described hereinbefore. At the same time, the processing element 106, 306 is configured to 'freeze' the relationship between the projection 204a and the first representation 210a. Consequently, the user moves the imaging element 104 displaying the image into a second position and issues a second command to 'unfreeze' the relationship between the projection 204a and the first representation 210a. Now the second position and orientation of the imaging element 104 determines the new position and orientation of the projection 'frozen' in the first position of the imaging element 104, and the processing element is configured to re-determine the position and/or the orientation of the first representation 210a accordingly. The re-determination of the position and/or the orientation of the first representation 210a may comprise for example re-determining a mapping function or an inverse mapping function described above to account for the re-determined position and/or orientation of the first representation 210a.

According to an embodiment of the invention, in addition to the first data, there may be second data associated with the first data. Furthermore, there may be any number of further data sets associated with the first data, i.e. third data, fourth data, etc. In the following first data and second data are discussed, but the discussion generalizes to any number of data sets.

According to an embodiment of the invention, the imaging apparatus 100 may be configured to enable determining the second subset of data as a subset of the second data associated with the first data, and consequently determine the image based on the second subset of data instead of the first subset of data. Hence, the image may be considered as a second representation based at least in part on the second data associated with the first data.

The selection between determining the image based on the first subset or the second subset may be made by the user for example by using the user interface 310 of the imaging element 104. As an example, this may comprise using a touch screen, keys, a keyboard or a keypad or other suitable arrangement that enables input of data and commands by the user comprised.

According to an embodiment of the invention, the orientation of the imaging element 104 may be used to control the selection between determining the image based on the first subset or the second subset. If, for example, the imaging element 104 comprises a display unit 302 comparing a translucent display element that may display an image on both sides of the display element, the selection between the first subset and the second subset of data may be made based on which side of the display unit 302 is currently facing a predetermined viewing point, for example the viewing position determined in the calibration information. The orientation of the imaging unit 104, and hence the orientation of the display unit 302 with respect to the viewing point, may be determined for example based on data obtained from the sensor unit 304. The correspondence between the first data and the second data may be determined directly or via the first representation, for example by using one or more mapping functions and/or inverse mapping functions, as discussed in detail in the following.

According to an embodiment, the correspondence between the first data and the second data may be determined for example by a second mapping function g( ) that describes the mapping from an element of the first data to a corresponding element of the second data. Conversely, a second inverse mapping function $g^{-1}$( ) may determine a mapping between an element of the second data and a corresponding element of the first data. Consequently, the correspondence between a given element of the second data associated with the first data and a position in the first representation 210a, 210b based at least in part on the first data may be established by first determining the element of the first data corresponding to the given element of the second data by using the second inverse mapping function $g^{-1}$( ), and then determining the position in the first representation 210a, 210b corresponding to the determined element of the first data by using a first mapping function f( ). Likewise, the correspondence between a given position in a first representation 210a, 210b based at least in part on the first data and an element of the second data associated with the first data may be established by first determining the element of the first data corresponding to the given position in the first representation 210a, 210b by using a first inverse mapping function $f^{-1}$( ) and then determining the element of the second data corresponding to the determined element of the first data by using the second mapping function g( ).

Hence, according to an embodiment of the invention the processing unit 106, 306 is configured to use the first and second mapping functions and/or the first and second inverse mapping functions to determine a first subset of data as the subset of the first data corresponding to the projection 204a, 204b of the imaging element 104 on the first representation 210a, 210b, and to determine a second subset of data as the subset of second data associated with the first data, the second subset of data corresponding to the first subset of data. In other words, a subset of the second data corresponding to the projection 204a, 204b on the first representation 210a, 210b is determined, and the image is determined based on the second subset.

According to another embodiment of the invention, the correspondence between the first data and the second data associated with the first data is determined via the first representation 210a, 210b based at least in part on the first data. In this approach a first mapping function f( ) and a first inverse mapping function $f^{-1}$( ) determine the correspondence between the first data and the first representation 210a, 210b, and in a similar manner a third mapping function h( ) and a third inverse mapping function $h^{-1}$( ) determine the correspondence between the second data and the first representation 210a, 210b. Hence, correspondence between a given element of the first data and the corresponding element in the second data may be determined by first determining the position in the first representation 210a, 210b corresponding to the given element of the first data by using the first mapping function f( ) and then determining the element of the second data corresponding to the determined position by using the third inverse mapping function $h^{-1}$( ). In a similar manner, an element of the first data corresponding to a given element of the second data may be found by first determining the position of the first representation 210a, 210b corresponding to the given element of the second data by using the third mapping function h( ) and then determining the element of the first data corresponding to the determined position by using the first inverse mapping function $f^{-1}$( ). If the first data and the second data exhibit a similar structure, e.g. a similar number of dimensions of similar size, the first and third mapping functions f( ) and h( ), respectively—and the first and third inverse mapping functions $f^{-1}$( ) and $h^{-1}$( ), respectively—may by identical, requiring only usage of a single mapping function and a single inverse mapping function applicable for both data sets.

Hence, according to an embodiment of the invention the processing unit 106, 306 is configured to use the first and third mapping functions and/or the first and third inverse mapping functions to determine a first subset of data as the subset of the first data corresponding to the projection 204a, 204b of the imaging element 104 on the first representation 210a, 210b, and to determine a second subset of data as the subset of second data associated with the first data, the second subset of data corresponding to the first subset of data, and determining the image based on the second subset of data.

The first data, the second data, the mapping function(s) and the inverse mapping function(s) may be stored in the memory 108, 308, and the correspondence between the first/second data and the projection 204a, 204b on the first representation is determined by the processing element 106, 306.

Figure 4:
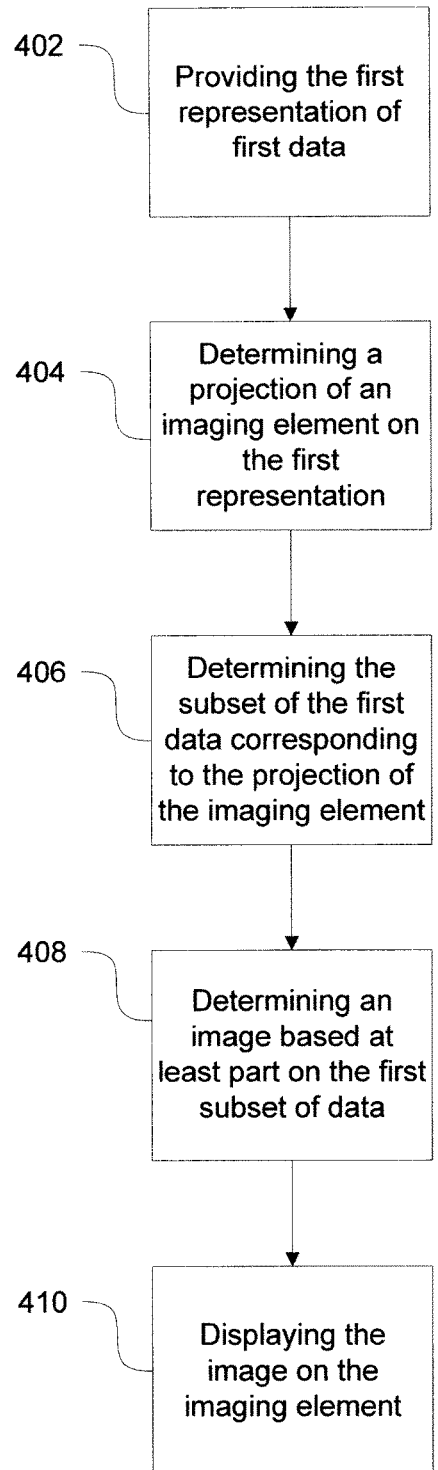
FIG. 4 provides an example flowchart illustrating a method according to embodiments of the invention.

FIG. 4 provides an example flowchart illustrating a method 400 for determining an image based at least in part on first data having a first representation according to embodiments of the invention.

In an embodiment of the invention, the method 400 may optionally comprise providing the first representation of first data, as illustrated in step 402. In step 404 a projection of an imaging element on the first representation, the imaging element being arranged to at least partly overlap with the first representation is determined. The determination of the projection may comprise obtaining information regarding the position of the imaging element and/or the orientation of the imaging element within a virtual volume in a space. Furthermore, determining the projection may further comprise obtaining information regarding the position and/or orientation of the imaging element with respect to the first representation.

According to an embodiment, obtaining information regarding the position and/or the orientation of the imaging element within the virtual volume comprises obtaining sensory data, for example data regarding a position and/or an orientation from an accelerometer.

In accordance with an embodiment of the invention, obtaining sensory data comprises obtaining data regarding a position and/or an orientation with respect to a positioning reference, for example data regarding a position and/or an orientation with respect to a magnetic field from a magnetometer.

In step 406, a first subset of data as the subset of the first data corresponding to the projection of the imaging element on the first representation is determined, and in step 408 an image based at least in part on the first subset of data is determined. According to an embodiment of the invention, determining the image comprises determining a second subset of data as the subset of second data associated with the first data, the second subset of data corresponding to the first subset of data, and determining the image based on the second subset of data. In an embodiment of the invention, the first representation comprises a two-dimensional image displayed on a surface, and determining the projection may comprise determining the projection of the imaging element on the two-dimensional image. In another embodiment, the first representation comprises a virtual volume in a three-dimensional space. Furthermore, according to an embodiment of the invention, determining the projection comprises determining a two-dimensional intersection of an imaging element and the virtual volume.

According to an embodiment, the determined image may be displayed on the imaging element, as illustrated by step 410.

The method 400 may be implemented as hardware, as software or as a combination of hardware and software. As an example, the method 400 may be implemented as program code configured to realize the steps of the method 400, stored on a computer readable storage medium, such as fixed or removable hard-drive, an optical drive, a memory stick, a CD-ROM, a DVD-ROM, or other type of computer readable storage medium suitable for storing program code.

Figures 5A, 5B:
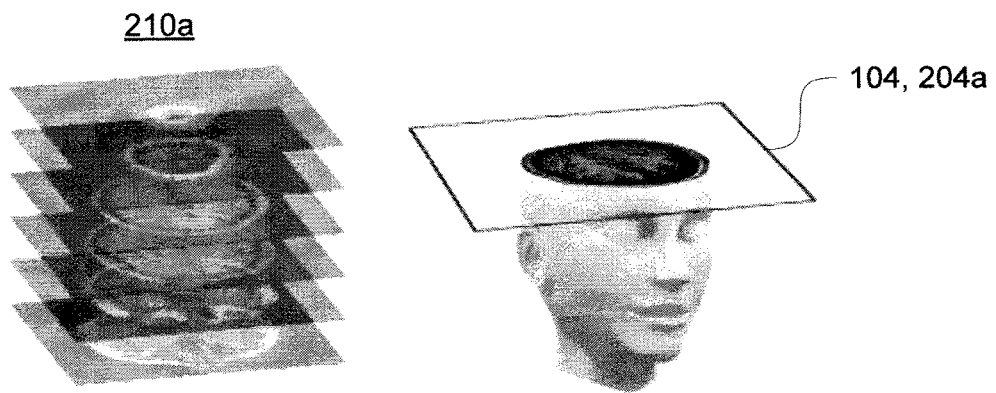
FIGS. 5a to 5c illustrate an example of an arrangement for visualizing data using an imaging apparatus according to an embodiment of the invention.
Figure 5C:
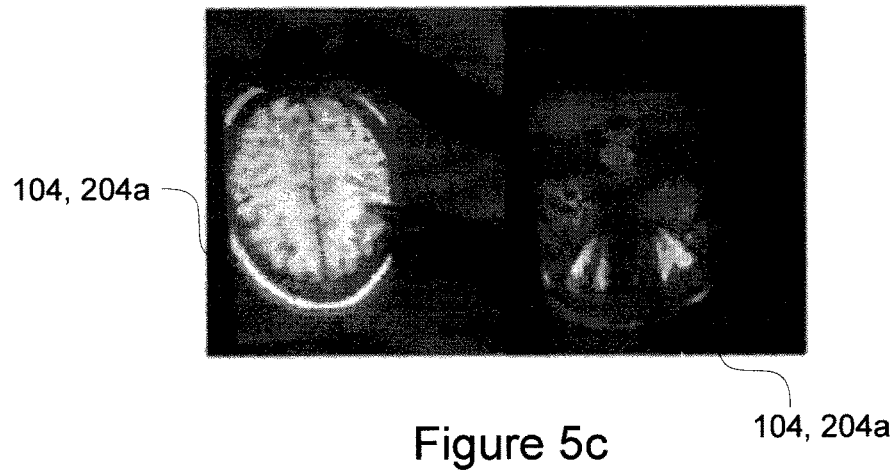

FIGS. 5a to 5c illustrate an example of an arrangement for visualizing data using the imaging apparatus 100 according to an embodiment of the invention. FIG. 5a shows a series of two-dimensional images providing images representing an MRI scan of a patient's head as the first data. These two-dimensional images are arranged to form a first representation of the first data as a virtual volume 210a in space, thereby providing a three dimensional representation of the first data. FIG. 5b illustrates the real life object—i.e. the patient's head—corresponding to the data represented by the virtual volume 210a and the concept of using the imaging element 104 for providing a projection 204a of the imaging element 104 on the first representation 210a. FIG. 5c illustrates two examples of arranging the imaging element 104 to at least partly overlap with the first representation 210a and displaying, on the imaging element 104, an image determined based at least in part on the first subset of data corresponding to the projection 204a of the imaging element 104 on the first representation 210a.

Figures 6A, 6B:
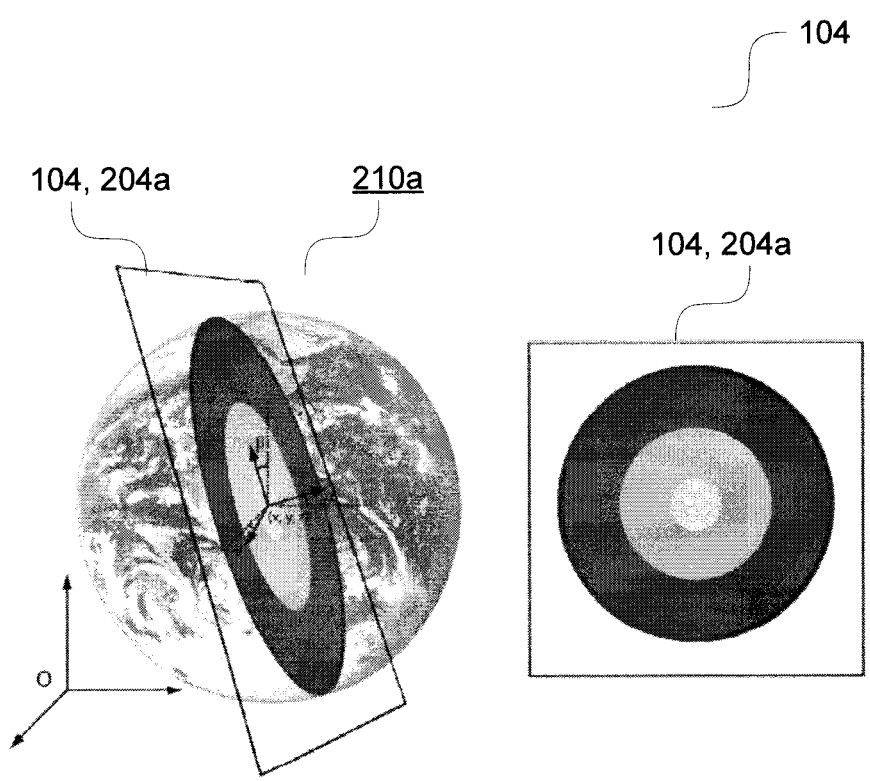
FIGS. 6a and 6b provide an example on first data having a first representation comprising a virtual volume in a space.

FIGS. 6a and 6b provides a further example on first data having a first representation comprising a virtual volume 210a in a space. FIG. 6a illustrates a concept of visualizing the structure of the earth using an arrangement and/or an imaging apparatus 100 according to an embodiment of the invention. A series of two-dimensional images illustrating intersections of the earth providing the first data are arranged into a virtual volume 210a in space to provide the first representation of the first data. Furthermore, the imaging element 104 is arranged to provide a projection 204a on the first representation 210a as an intersection of the first representation 210a. FIG. 6b further illustrates displaying, on the imaging element 104, an image determined based at least in part on the first subset of data corresponding to the projection 204*a* of the imaging element 104 on the first representation 210*a*.

Figure 7:
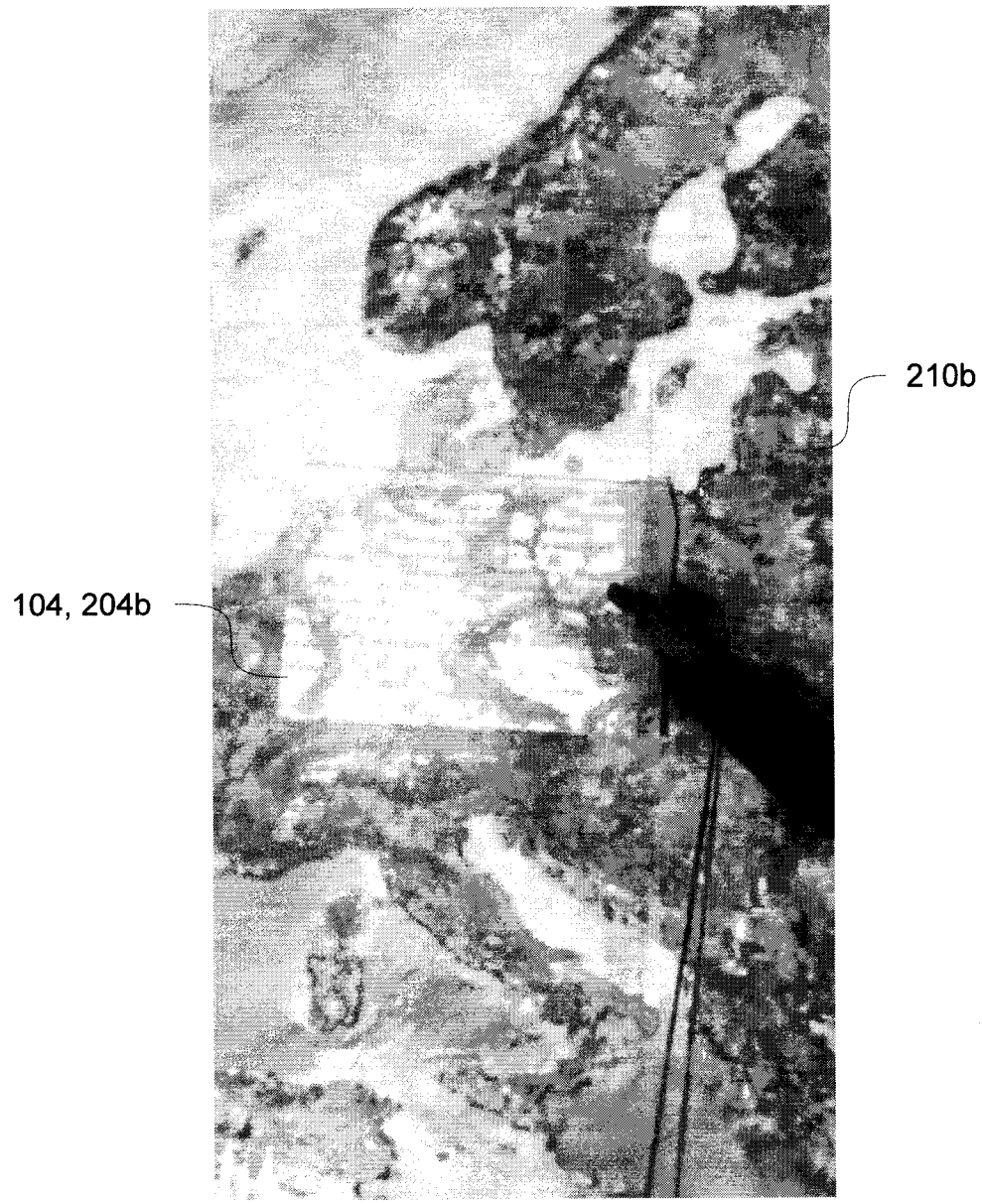
FIG. 7 provides an example of an arrangement for visualizing data using an imaging apparatus according to an embodiment of the invention.

FIG. 7 provides an example of an arrangement for visualizing data using the imaging apparatus 100 according to an embodiment of the invention. In this example the first data determines an image of a map corresponding to a first point of time. The first representation of the first data is provided as a two-dimensional image 210*b* displayed on a surface. The imaging element 104 is arranged to overlap with the first representation 210*b*, and an image, determined based at least in part on the first subset of data corresponding to the projection 204*b* of the imaging element 104 on the first representation 210*b* is displayed on the imaging element 104. Furthermore, in this example the image is based on a second data, wherein the image is determined based on a second subset of data, which is a subset of second data associated with the first data, the second subset of data corresponding to the first subset of data. Furthermore, the second data determines an image of a map of the same area as the first data, corresponding to a second point of time.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. Furthermore, features associated with a certain embodiment can be freely combined with features of other embodiments unless explicitly stated otherwise. Various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

In this invention, the terms "comprising", "to comprise" and derivatives thereof are used to indicate an open-ended structure. I.e. an entity comprising a specified element or function may or may not comprise any number of further elements or functions.

The invention claimed is:

1. A method for determining an image based at least in part on first data having a first representation, the method comprising:
   determining a projection of an imaging element on the first representation in response to the imaging element being arranged to at least partly overlap with the first representation, the imaging element comprising a display for displaying the image,
   determining a first subset of data as the subset of the first data corresponding to the projection of the imaging element on the first representation, and
   determining the image based at least in part on the first subset of data corresponding to the projection of the imaging element on the first representation,
   displaying the determined image on said display of the imaging element.

2. A method according to claim 1, wherein determining the projection comprises obtaining information regarding the position of the imaging element and/or the orientation of the imaging element within a virtual volume in a space.

3. A method according to claim 2, wherein determining the projection further comprises obtaining information regarding the position and/or orientation of the imaging element with respect to the first representation.

4. A method according to claim 2, wherein obtaining information regarding the position and/or the orientation of the imaging element within the virtual volume comprises obtaining sensory data.

5. A method according to claim 4, wherein obtaining sensory data comprises obtaining data regarding a position and/or an orientation from an accelerometer.

6. A method according to claim 4, wherein obtaining sensory data comprises obtaining data regarding a position and/or an orientation with respect to a positioning reference.

7. A method according to claim 6, wherein obtaining sensory data comprises obtaining data regarding a position and/or an orientation with respect to a magnetic field from an electromagnetic sensor.

8. A method according to claim 1, wherein the first representation comprises a two-dimensional image displayed on a surface, and wherein determining the projection comprises determining the projection of the imaging element on the two-dimensional image.

9. A method according to claim 1, wherein the first representation comprises a virtual volume in a space, and wherein determining the projection comprises determining a two-dimensional intersection of the imaging element and the virtual volume.

10. A method according to claim 1, further comprising providing the first representation.

11. A method according to claim 1, wherein determining the image comprises determining a second subset of data as the subset of second data associated with the first data, the second subset of data corresponding to the first subset of data, and determining the image based on the second subset of data.

12. An imaging apparatus for determining an image based at least in part on first data having a first representation, the apparatus comprising:
   an imaging element for providing a projection on the first representation, the imaging element comprising a display for displaying the image,
   a processing element, configured to
      determine a projection of the imaging element on the first representation in response to the imaging element being arranged to at least partly overlap with the first representation,
      determine a first subset of data as the subset of the first data corresponding to the projection of the imaging element on the first representation,
      determine the image based at least in part on the first subset of data corresponding to the projection of the imaging element on the first representation, and
      display the determined image on said display of the imaging element.

13. An imaging apparatus according to claim 12, wherein determining a projection comprises obtaining information regarding the position of the imaging element and/or the orientation of the imaging element with respect to a virtual volume in a space.

14. An imaging apparatus according to claim 13, wherein the imaging element further comprises a sensor providing information regarding the position and/or the orientation of the imaging element within the virtual volume.

15. An imaging apparatus according to claim 14, wherein the sensor is an accelerometer.

16. An imaging apparatus according to claim 14, wherein the sensor is configured to information regarding the position and/or the orientation with respect to a positioning reference.

17. An imaging apparatus according to claim 16, wherein the sensor is an electromagnetic sensor providing data regarding a position and/or an orientation with respect to a magnetic field.

18. An imaging apparatus according to claim 12, wherein the first representation comprises a two-dimensional image displayed on a surface, and wherein determining the projection comprises determining the projection of the imaging element on the two-dimensional image.

19. An imaging apparatus according to claim 12, wherein the first representation comprises a virtual volume in a space, and wherein determining the projection comprises determining a two-dimensional intersection of the imaging element and the virtual volume.

20. An imaging apparatus according to claim 12, wherein determining the image comprises determining a second subset of data as the subset of second data associated with the first data, the second subset of data corresponding to the first subset of data, and determining the image based on the second subset of data.

21. An arrangement for visualizing data, comprising:
   means for providing a positioning reference within a virtual volume in a space, and
   an imaging apparatus according to claim 12.

22. A non-transitory computer readable storage medium comprising program code for determining an image based at least part on first data having a first representation the program code configured to:
   determine a projection of an imaging element on the first representation in response to the imaging element being arranged to at least partly overlap with the first representation,
   determine a first subset of data as the subset of the first data corresponding to the projection of the imaging element on the first representation,
   determine the image based at least in part on the first subset of data corresponding to the projection of the imaging element on the first representation, and
   display the determined image on a display element of the imaging element.

* * * * *